United States Patent [19]

Eisenbeis et al.

[11] Patent Number: 5,641,806
[45] Date of Patent: Jun. 24, 1997

[54] GROWTH PROMOTION AND FEED UTILIZATION IN SWINE WITH FRENOLICIN B

[75] Inventors: Howard George Eisenbeis, Wrightstown, N.J.; Ross William Miller, Blue Bell, Pa.; Eugene George Schildrnecht, Hackettstown, N.J.

[73] Assignee: Roche Vitamins Inc., Paramus, N.J.

[21] Appl. No.: 419,293

[22] Filed: Apr. 10, 1995

Related U.S. Application Data

[63] Continuation of Ser. No. 259,937, Jun. 14, 1994, abandoned, which is a continuation of Ser. No. 66,613, May 28, 1993, abandoned, which is a continuation-in-part of Ser. No. 919,809, Jul. 24, 1992, abandoned.

[51] Int. Cl.⁶ ............................................. A61K 31/35
[52] U.S. Cl. ............................................. 514/453
[58] Field of Search ........................ 514/453; 549/298

[56] References Cited

U.S. PATENT DOCUMENTS

| | | | |
|---|---|---|---|
| 4,199,514 | 4/1980 | Omura et al. | 549/298 |
| 4,839,382 | 6/1989 | Maestrone et al. | 514/453 |

*Primary Examiner*—Kevin E. Weddington
*Attorney, Agent, or Firm*—George W. Johnston; Dennis P. Tramaloni; Alan P. Kass

[57] ABSTRACT

Methods and compositions for enhancing the growth and increasing the feed utilization of swine by using frenolicin B as the active ingredient to promote growth and increase feed utilization in swine. Frenolicin B is used in sufficient amounts to achieve the desired results, for example, about 20 grams of frenolicin B per ton of feed to about 60 grams of frenolicin B per ton of feed.

6 Claims, No Drawings

GROWTH PROMOTION AND FEED UTILIZATION IN SWINE WITH FRENOLICIN B

This is a continuation of application Ser. No. 08/259,937, filed Jun. 14, 1994, now abandoned which is a continuation of application Ser. No. 08/066,613, filed May 28, 1993, now abandoned, which is a continuation-in-part application of Ser. No. 07/919,809, filed Jul. 24, 1992, now abandoned.

BACKGROUND OF THE INVENTION

Field of the Invention

The present invention relates to growth promotion in swine, and, more particularly, to a method of increasing growth and feed utilization in swine and to swine feeds and compositions containing frenolicin B.

SUMMARY OF THE INVENTION

The present invention relates to methods and compositions for enhancing the growth and increasing the feed utilization of swine by using frenolicin B as the active ingredient to promote growth and increase feed utilization in swine.

DETAILED DESCRIPTION OF THE INVENTION

Frenolicin B is a fermentation product having antibiotic properties. See U.S. Pat. No. 4,199,514, the contents of which are hereby incorporated by reference.

Frenolicin B also has anticoccidial activity and enhances the activity of ionophores, for example, lasalocid, against avian coccidia. See U.S. Pat. No. 4,839,382.

It has now been found that the growth and the feed utilization in swine is improved by orally administering to the swine, in combination with their feed, sufficient amounts of frenolicin B to achieve the desired effect.

The compositions of this invention can be prepared by mixing the active ingredient, frenolicin B, either directly, or as part of a concentrate or premix, into a conventional swine feed. It has been found that if the active ingredient is combined with the feed in proportions of from about 20 grams to about 60 grams per ton of feed, the desired growth promotion and feed efficiency occurs. A preferred range is from about 40 grams per ton to about 60 grams per ton. The preferred amount of active ingredient combined with the swine feed, according to this invention, is about 60 grams per ton of feed.

It is generally most desirable to combine sufficient amount of the active ingredient with the ration to provide about 1.5 mg per pound of body weight per day in the feed of young pigs and about 0.75 mg per pound of body weight per day in pigs ready for market. These figures represent the average amounts of medicament ingested with feed by the animals when the feed contains about 50 gms of the active ingredient per ton. These amounts can, of course, be varied depending on the size and condition of the animals. In this regard, for the range of from about 20 grams per ton to about 60 grams per ton, the amount per pound body weight per day in the feed of young pigs is from about 0.6 mg to about 2.4 mg. For the range of from about 20 grams per ton of feed to about 60 grams per ton of feed, the amount per pound of body weight per day in the feed of pigs ready for market is from about 0.3 mg to about 1.2 mg.

Usually, for growth promotant effects in swine, the active compounds are included in the feed beginning with weaning until the age and weight suitable for marketing is reached.

The compositions of this invention can be suitably formed by (1) adding the active compounds directly to conventional swine feed by mixing, for example, in a vertical feed mixer; (2) forming a concentrate or premix of the active ingredients by mixing it with a suitable non-toxic edible carrier, e.g., corn meal, corn distillers dried grains, soybean meal, soya grits, soy flour, wheat middlings, farina, rice grits, malt sprouts, limestone, oyster shell meal, oyster shell flour, rice bran, crimped oats, oatmeal, brewers grains, salt, calcium silicate, clay, dicalcium phosphate, talc, fish meal, dried fish solubles, meat scraps, tankage, bone meal, dried whey, dried milk solids, antibiotic mycelia, fermentation solubles, distillers solubles, molasses solubles, dried yeast, dried citrus meal, etc. and the like and including various oils and the like, for example, soy oil, which can be used in forming the premix; then adding the premix or concentrate to the feed, either in a feed mixer or a feed blender.

The concentration of the active ingredient (frenolicin B) in the premix can range from a very small amount (<5%) to a large amount (>50%) in order to provide for convenient mixing of complete rations. Generally, a sufficient amount of active ingredient is present so that the addition of approximately one pound of premix to the amount of feed required to total 2,000 lbs. will provide the desired dose level. For example: one pound of premix containing 60 grams of frenolicin B per pound of premix (13.4% premix) added to 1,999 lbs. of concentrate ration would yield a level of 60 grams of frenolicin B per ton of feed.

Examples of the types of premixes that could be used to provide desired dose levels are shown below.

| Premix #1 | | | |
|---|---|---|---|
| Ingredient | Grams/Kilogram | | |
| MIXTURE | A | B | C |
| Frenolicin B | 22 | 44 | 66 |
| Calcium Silicate (Microcel E) | 20 | 20 | 20 |
| Calcium Carbonate (Oyster Shell Flour) | 958 | 936 | 912 |
| Total Weight | 1000 | 1000 | 1000 |

The frenolicin B is blended with Microcel E to make a pre-mix. The oyster shell flour is placed in a suitable mixer, the pre-mix is added and the entire amount is mixed until homogeneous.

This pre-mix is then added to commercial swine ration at the rate of about 2 pounds per ton to yield a concentration of about 20 grams frenolicin B per ton for MIXTURE A, about 40 grams frenolicin B per ton for MIXTURE B, and about 60 grams frenolicin B per ton for MIXTURE C. The commercial feeds to which this pre-mix is added may be free of other medicaments or may contain other medicaments if the final mixture is compatible therewith.

| Premix #2 | | | |
|---|---|---|---|
| Ingredient | Grams/Kilogram | | |
| MIXTURE | A | B | C |
| Frenolicin B | 22 | 44 | 66 |
| Calcium Silicate (Microcel E) | 20 | 20 | 20 |

-continued

Premix #2

| Ingredient | Grams/Kilogram | | |
|---|---|---|---|
| MIXTURE | A | B | C |
| Soy Oil | 20 | 20 | 20 |
| Ground Rice Hulls | 938 | 916 | 894 |
| Total Weight | 1000 | 1000 | 1000 |

The ground rice hulls is placed in a suitable mixer and about 20 grams (2% by weight of the final mixture) of the soy oil is slowly added thereto and the whole thoroughly mixed. The frenolicin B with the Microcel E is added thereto and the whole thoroughly mixed until homogeneous.

This pre-mix is then added to commercial swine ration at the rate of about 2 pounds per ton to yield a concentration of about 20 grams frenolicin B per ton for MIXTURE A, about 40 grams frenolicin B per ton for MIXTURE B, and about 60 grams frenolicin B per ton for MIXTURE C. The commercial feeds to which this pre-mix is added may be free of other medicaments or may contain other medicaments if the final mixture is compatible therewith.

The following example illustrates the invention.

Sixty-four crossbred feeder pigs (32 male and 32 female) averaging 35 lbs in body weight were randomly assigned to one of four treatment groups. The four treatment groups were 0 (Control), 20, 40 or 60 grams of frenolicin-B per ton of feed. Each treatment group contained four replicates of four pigs each. There were 16 pigs (8 male and 8 female) assigned to each treatment group with males and females penned separately yielding two replicates each of male or female pigs for each treatment group. Four pigs of the same sex were randomly assigned to a pen, then two pens of the same sex were randomly assigned to each of the four treatment groups. Each pig was identified by individual unique numbered ear tags.

The four pigs of each replicate were housed together in separate pens that provided approximately 10 square feet per animal. The pens were constructed of concrete block walls with a partially slatted concrete floor to control waste. Feed was provided ad libitum in gravity flow feeders and water was supplied ad libitum via automatic nipple type waterers.

The pigs were fed a diet, typical of commercial rations according to the following table:

| Diet | Protein Level | Approximate Body Weight of Pigs |
|---|---|---|
| Starter | 19% | 35–75 lbs. |
| Grower | 16% | 75–110 lbs. |
| Finisher | 13% | 110 lbs.+ |

Body weights (in lbs.) were obtained every seven days for 56 days, for each pig, and the feed remaining in each feeder was weighed each week, at the time of body weight collection, to determine the amount of feed consumed for each pen. Average daily gain (lbs./head/day) and feed conversion, feed consumed per pound of body weight gained were calculated from body weights and feed consumption.

Individual body weights and pen feed consumption were obtained on day 0, 7, 14, 21, 28, 35, 42, 49 and 56 for the 0 (control), 20, 40, and 60 grams per ton treatment groups. The results for average daily gain for each pen at each weekly interval as well as cumulatively for each consecutive week are presented in Table 1. Table 2 contains the average feed conversion for each pen at each weekly interval and cumulatively for each consecutive week. Weekly and cumulative data for average daily feed consumption for each pen are presented in Table 3.

TABLE 1

| | | | AVERAGE DAILY GAIN (LBS) | | | | | | | | | | | | | |
|---|---|---|---|---|---|---|---|---|---|---|---|---|---|---|---|---|
| TREAT- | | | DAYS | | | | | | | | | | | | | |
| MENT | PEN | SEX | 0–7 | 8–14 | 0–14 | 15–21 | 0–21 | 22–28 | 0–28 | 29–35 | 0–35 | 36–42 | 0–42 | 43–49 | 0–49 | 50–56 | 0–56 |
| CON- | 5 | F | 1.30 | 1.78 | 1.54 | 1.60 | 1.56 | 1.79 | 1.62 | 1.60 | 1.62 | 1.71 | 1.63 | 1.54 | 1.62 | 1.45 | 1.60 |
| TROL | 7 | M | 1.49 | 1.76 | 1.63 | 1.78 | 1.68 | 1.71 | 1.69 | 1.81 | 1.71 | 1.95 | 1.75 | 1.76 | 1.75 | 1.84 | 1.76 |
| | 10 | M | 1.43 | 1.82 | 1.63 | 1.76 | 1.67 | 1.89 | 1.72 | 1.89 | 1.76 | 1.89 | 1.78 | 1.52 | 1.74 | 1.65 | 1.73 |
| | 11 | F | 1.40 | 1.62 | 1.51 | 1.67 | 1.56 | 1.82 | 1.63 | 1.71 | 1.64 | 1.73 | 1.66 | 1.82 | 1.68 | 1.74 | 1.69 |
| AVER- | | | 1.41 | 1.75 | 1.58 | 1.70 | 1.62 | 1.80 | 1.67 | 1.75 | 1.68 | 1.82 | 1.71 | 1.66 | 1.70 | 1.67 | 1.70 |
| AGE | | | | | | | | | | | | | | | | | |
| FRENO- | 4 | M | 1.63 | 1.89 | 1.76 | 1.67 | 1.73 | 1.76 | 1.74 | 2.01 | 1.79 | 1.82 | 1.80 | 2.04 | 1.83 | 2.04 | 1.86 |
| LICIN 20 | 6 | F | 1.43 | 1.95 | 1.69 | 1.87 | 1.75 | 1.87 | 1.78 | 2.07 | 1.84 | 1.78 | 1.83 | 1.46 | 1.78 | 2.06 | 1.81 |
| G/TON | 9 | F | 1.48 | 1.56 | 1.52 | 1.76 | 1.60 | 1.74 | 1.63 | 1.85 | 1.68 | 2.00 | 1.73 | 1.89 | 1.75 | 1.87 | 1.77 |
| | 14 | M | 1.56 | 1.85 | 1.71 | 1.82 | 1.74 | 1.96 | 1.80 | 2.09 | 1.86 | 2.06 | 1.89 | 1.87 | 1.89 | 1.87 | 1.89 |
| AVER- | | | 1.53 | 1.81 | 1.67 | 1.78 | 1.71 | 1.83 | 1.74 | 2.01 | 1.79 | 1.92 | 1.81 | 1.82 | 1.81 | 1.96 | 1.83 |
| AGE | | | | | | | | | | | | | | | | | |
| FRENO- | 2 | M | 1.67 | 1.84 | 1.75 | 2.11 | 1.87 | 2.00 | 1.90 | 2.42 | 2.01 | 2.12 | 2.02 | 2.28 | 2.06 | 2.39 | 2.10 |
| LICIN 40 | 3 | F | 1.49 | 1.59 | 1.54 | 1.46 | 1.51 | 1.27 | 1.45 | 1.40 | 1.44 | 1.84 | 1.51 | 1.49 | 1.51 | 1.79 | 1.54 |
| G/TON | 12 | F | 1.54 | 1.65 | 1.60 | 1.67 | 1.62 | 1.87 | 1.68 | 2.11 | 1.77 | 1.96 | 1.80 | 1.95 | 1.82 | 2.01 | 1.84 |
| | 16 | M | 1.84 | 2.01 | 1.93 | 1.95 | 1.93 | 2.17 | 1.99 | 2.04 | 2.00 | 2.31 | 2.05 | 2.15 | 2.07 | 2.25 | 2.09 |
| AVER- | | | 1.64 | 1.77 | 1.71 | 1.80 | 1.73 | 1.83 | 1.76 | 1.99 | 1.81 | 2.06 | 1.85 | 1.97 | 1.87 | 2.11 | 1.89 |
| AGE | | | | | | | | | | | | | | | | | |
| FRENO- | 1 | M | 1.52 | 1.81 | 1.67 | 1.82 | 1.72 | 2.03 | 1.80 | 2.17 | 1.87 | 2.12 | 1.91 | 2.34 | 1.97 | 1.85 | 1.96 |
| LICIN 60 | 8 | F | 1.52 | 1.87 | 1.70 | 1.76 | 1.72 | 1.93 | 1.77 | 1.67 | 1.75 | 1.92 | 1.78 | 1.78 | 1.78 | 1.79 | 1.78 |
| G/TON | 13 | M | 1.65 | 1.85 | 1.75 | 1.78 | 1.76 | 2.01 | 1.82 | 2.18 | 1.90 | 2.25 | 1.95 | 1.96 | 1.96 | 2.11 | 1.97 |
| | 15 | F | 1.61 | 1.97 | 1.79 | 1.89 | 1.82 | 2.05 | 1.88 | 2.30 | 1.97 | 2.10 | 1.99 | 1.95 | 1.98 | 2.10 | 2.00 |
| AVER- | | | 1.58 | 1.88 | 1.73 | 1.81 | 1.76 | 2.01 | 1.82 | 2.08 | 1.87 | 2.10 | 1.91 | 2.01 | 1.92 | 1.96 | 1.93 |
| AGE | | | | | | | | | | | | | | | | | |

TABLE 2

AVERAGE FEED CONVERSION

| TREATMENT | PEN | SEX | DAYS | | | | | | | | | | | | | | |
|---|---|---|---|---|---|---|---|---|---|---|---|---|---|---|---|---|---|
| | | | 0–7 | 8–14 | 0–14 | 15–21 | 0–21 | 22–28 | 0–28 | 29–35 | 0–35 | 36–42 | 0–42 | 43–49 | 0–49 | 50–56 | 0–56 |
| CONTROL | 5 | F | 1.80 | 1.81 | 1.80 | 2.29 | 1.97 | 2.36 | 2.08 | 2.61 | 2.18 | 2.66 | 2.27 | 2.96 | 2.36 | 3.19 | 2.46 |
| | 7 | M | 1.55 | 1.73 | 1.65 | 2.32 | 1.88 | 2.44 | 2.02 | 2.49 | 2.12 | 2.79 | 2.25 | 3.16 | 2.38 | 3.12 | 2.47 |
| | 10 | M | 1.77 | 1.80 | 1.79 | 2.28 | 1.96 | 2.43 | 2.09 | 2.51 | 2.18 | 2.67 | 2.26 | 3.32 | 2.40 | 3.23 | 2.50 |
| | 11 | F | 1.69 | 1.87 | 1.79 | 2.23 | 1.94 | 2.34 | 2.05 | 2.48 | 2.14 | 2.73 | 2.24 | 2.78 | 2.33 | 3.02 | 2.42 |
| AVERAGE | | | 1.70 | 1.80 | 1.76 | 2.28 | 1.94 | 2.39 | 2.06 | 2.52 | 2.16 | 2.71 | 2.26 | 3.06 | 2.37 | 3.14 | 2.46 |
| FRENOLICIN 20 G/TON | 4 | M | 1.60 | 1.76 | 1.69 | 2.46 | 1.93 | 2.43 | 2.06 | 2.31 | 2.12 | 2.75 | 2.22 | 2.65 | 2.29 | 2.86 | 2.37 |
| | 6 | F | 1.56 | 1.64 | 1.61 | 2.16 | 1.80 | 2.50 | 1.99 | 2.17 | 2.03 | 2.85 | 2.16 | 3.42 | 2.31 | 2.56 | 2.34 |
| | 9 | F | 1.71 | 1.96 | 1.84 | 2.13 | 1.94 | 2.44 | 2.08 | 2.39 | 2.15 | 2.46 | 2.21 | 2.98 | 2.33 | 2.98 | 2.41 |
| | 14 | M | 1.66 | 1.92 | 1.80 | 2.35 | 1.99 | 2.54 | 2.14 | 2.44 | 2.21 | 2.70 | 2.30 | 3.29 | 2.44 | 3.29 | 2.54 |
| AVERAGE | | | 1.63 | 1.82 | 1.74 | 2.28 | 1.92 | 2.48 | 2.07 | 2.33 | 2.13 | 2.69 | 2.22 | 3.09 | 2.34 | 2.92 | 2.42 |
| FRENOLICIN 40 G/TON | 2 | M | 1.71 | 1.97 | 1.85 | 2.27 | 2.01 | 2.54 | 2.15 | 2.35 | 2.20 | 2.60 | 2.27 | 2.87 | 2.36 | 2.82 | 2.43 |
| | 3 | F | 1.71 | 1.97 | 1.84 | 2.47 | 2.05 | 2.94 | 2.24 | 2.68 | 2.33 | 2.53 | 2.37 | 3.38 | 2.51 | 2.92 | 2.57 |
| | 12 | F | 1.78 | 1.90 | 1.84 | 2.13 | 1.94 | 2.34 | 2.05 | 2.29 | 2.11 | 3.07 | 2.28 | 3.02 | 2.40 | 3.01 | 2.48 |
| | 16 | M | 1.49 | 1.82 | 1.66 | 2.20 | 1.84 | 2.29 | 1.97 | 2.54 | 2.08 | 2.56 | 2.17 | 2.82 | 2.27 | 2.74 | 2.33 |
| AVERAGE | | | 1.67 | 1.92 | 1.80 | 2.27 | 1.96 | 2.53 | 2.10 | 2.47 | 2.18 | 2.69 | 2.27 | 3.02 | 2.39 | 2.87 | 2.45 |
| FRENOLICIN 60 G/TON | 1 | M | 1.60 | 1.70 | 1.66 | 2.15 | 1.83 | 2.26 | 1.95 | 2.24 | 2.02 | 2.59 | 2.12 | 2.65 | 2.21 | 3.43 | 2.36 |
| | 8 | F | 1.68 | 1.58 | 1.63 | 2.19 | 1.82 | 2.24 | 1.93 | 2.46 | 2.03 | 2.34 | 2.09 | 2.83 | 2.19 | 3.09 | 2.31 |
| | 13 | M | 1.70 | 1.81 | 1.76 | 2.17 | 1.90 | 2.25 | 1.99 | 2.26 | 2.05 | 2.41 | 2.12 | 2.96 | 2.24 | 2.95 | 2.34 |
| | 15 | F | 1.55 | 1.62 | 1.59 | 1.92 | 1.70 | 2.31 | 1.87 | 2.07 | 1.92 | 2.57 | 2.03 | 2.87 | 2.15 | 2.78 | 2.23 |
| AVERAGE | | | 1.63 | 1.68 | 1.66 | 2.11 | 1.81 | 2.27 | 1.94 | 2.26 | 2.01 | 2.48 | 2.09 | 2.83 | 2.20 | 3.06 | 2.31 |

TABLE 3

AVERAGE DAILY FEED CONSUMPTION (LBS)

| TREATMENT | PEN | SEX | DAYS | | | | | | | | | | | | | | |
|---|---|---|---|---|---|---|---|---|---|---|---|---|---|---|---|---|---|
| | | | 0–7 | 8–14 | 0–14 | 15–21 | 0–21 | 22–28 | 0–28 | 29–35 | 0–35 | 36–42 | 0–42 | 43–49 | 0–49 | 50–56 | 0–56 |
| CONTROL | 5 | F | 2.34 | 3.21 | 2.77 | 3.68 | 3.07 | 4.24 | 3.36 | 4.18 | 3.53 | 4.55 | 3.70 | 4.57 | 3.82 | 4.61 | 3.92 |
| | 7 | M | 2.31 | 3.05 | 2.68 | 4.12 | 3.16 | 4.17 | 3.41 | 4.49 | 3.63 | 5.43 | 3.93 | 5.56 | 4.16 | 5.73 | 4.36 |
| | 10 | M | 2.53 | 3.28 | 2.90 | 4.02 | 3.27 | 4.57 | 3.60 | 4.73 | 3.82 | 5.04 | 4.03 | 5.07 | 4.18 | 5.33 | 4.32 |
| | 11 | F | 2.37 | 3.03 | 2.70 | 3.71 | 3.03 | 4.27 | 3.34 | 4.24 | 3.52 | 4.72 | 3.72 | 5.06 | 3.91 | 5.26 | 4.08 |
| AVERAGE | | | 2.39 | 3.14 | 2.76 | 3.88 | 3.13 | 4.31 | 3.43 | 4.41 | 3.63 | 4.94 | 3.85 | 5.07 | 4.02 | 5.23 | 4.17 |
| FRENOLICIN 20 G/TON | 4 | M | 2.61 | 3.32 | 2.97 | 4.09 | 3.34 | 4.28 | 3.58 | 4.64 | 3.79 | 5.01 | 3.99 | 5.41 | 4.20 | 5.85 | 4.40 |
| | 6 | F | 2.23 | 3.20 | 2.71 | 4.03 | 3.15 | 4.68 | 3.53 | 4.50 | 3.73 | 5.07 | 3.95 | 5.00 | 4.10 | 5.27 | 4.25 |
| | 9 | F | 2.52 | 3.05 | 2.79 | 3.75 | 3.11 | 4.26 | 3.39 | 4.42 | 3.60 | 4.91 | 3.82 | 5.63 | 4.08 | 5.57 | 4.26 |
| | 14 | M | 2.59 | 3.57 | 3.08 | 4.28 | 3.48 | 4.98 | 3.85 | 5.09 | 4.10 | 5.56 | 4.35 | 6.16 | 4.60 | 6.15 | 4.80 |
| AVERAGE | | | 2.49 | 3.29 | 2.89 | 4.04 | 3.27 | 4.55 | 3.59 | 4.66 | 3.81 | 5.14 | 4.03 | 5.55 | 4.25 | 5.71 | 4.43 |
| FRENOLICIN 40 G/TON | 2 | M | 2.84 | 3.63 | 3.24 | 4.78 | 3.75 | 5.07 | 4.08 | 5.69 | 4.40 | 5.51 | 4.59 | 6.53 | 4.86 | 6.74 | 5.10 |
| | 3 | F | 2.55 | 3.13 | 2.84 | 3.61 | 3.10 | 3.75 | 3.26 | 3.75 | 3.36 | 3.66 | 3.58 | 5.04 | 3.78 | 5.23 | 3.97 |
| | 12 | F | 2.73 | 3.14 | 2.94 | 3.54 | 3.14 | 4.37 | 3.45 | 4.82 | 3.72 | 6.03 | 4.11 | 5.89 | 4.36 | 6.05 | 4.57 |
| | 16 | M | 2.74 | 3.65 | 3.20 | 4.29 | 3.56 | 4.97 | 3.91 | 5.19 | 4.17 | 5.92 | 4.46 | 6.07 | 4.69 | 6.16 | 4.87 |
| AVERAGE | | | 2.72 | 3.39 | 3.06 | 4.06 | 3.39 | 4.54 | 3.68 | 4.86 | 3.91 | 5.53 | 4.19 | 5.88 | 4.42 | 6.05 | 4.63 |
| FRENOLICIN 60 G/TON | 1 | M | 2.44 | 3.07 | 2.76 | 3.91 | 3.14 | 4.58 | 3.50 | 4.86 | 3.77 | 5.50 | 4.06 | 6.20 | 4.37 | 6.36 | 4.62 |
| | 8 | F | 2.55 | 2.96 | 2.76 | 3.85 | 3.12 | 4.33 | 3.42 | 4.09 | 3.56 | 4.48 | 3.71 | 5.02 | 3.90 | 5.54 | 4.10 |
| | 13 | M | 2.81 | 3.35 | 3.08 | 3.86 | 3.34 | 4.53 | 3.64 | 4.93 | 3.89 | 5.41 | 4.15 | 5.81 | 4.39 | 6.21 | 4.61 |
| | 15 | F | 2.50 | 3.18 | 2.84 | 3.62 | 3.10 | 4.74 | 3.51 | 4.78 | 3.77 | 5.37 | 4.03 | 5.59 | 4.26 | 5.82 | 4.45 |
| AVERAGE | | | 2.58 | 3.14 | 2.86 | 3.81 | 3.18 | 4.55 | 3.52 | 4.67 | 3.75 | 5.19 | 3.99 | 5.66 | 4.23 | 5.98 | 4.45 |

The study was conducted until day 56 at which time the average body weights (lbs.) for the 0, 20, 40 and 60 gram/ton treatment groups were 129.4, 138.3, 142.0 and 144.4, respectively.

The present improvement in average daily gain, feed conversion and feed intake of the frenolicin treated animals as compared to control for the 56 day feeding period is as follows:

| Treatment | Percent Improvement (%) | | Feed Intake (percent increase |
|---|---|---|---|
| Group | Avg. Daily Gain | Feed Conversion* | over control) |
| 0 | 0 | 0 | 0 |
| 20 | 7.7 | 1.6 | 6.2 |
| 40 | 11.2 | 0.4 | 11.0 |
| 60 | 13.5 | 6.1 | 6.7 |

*Percent change in feed conversion represents a decrease in the amount of feed consumed per pound of body weight gained by each treatment group as compared to control.

Statistical analysis of the results was completed using analysis of variance including terms for treatment, sex, and treatment by sex. Average daily gain from day 0 to week 8 and feed conversion from day 0 to week 6 and day 0 to week 8 were significantly different for the treatment groups. The results from the Linear Plateau Model for the overall performance indicates that the dose range of 20 to 40 grams/ton would improve average daily gain. Sixty grams/ton would have to be added to diets to achieve a statistically significant treatment and sex interaction overall.

There was a positive growth performance response for average daily gain and feed efficiency for all three frenolicin B treatment groups (20, 40 and 60 grams/ton). The highest level of 60 grams/ton produced the greatest (13.5%) increase in average daily gain and also provided the best feed efficiency with the treated animals converting 6.1% less feed per pound of body weight gain as compared to controls. The frenolicin-B treated pigs showed no signs of toxicity related to diets containing the experimental compound at 20, 40, or 60 grams/ton of feed.

The results obtained in this study indicate that Frenolicin B is very active as a growth promoter when added to swine starter and grower rations at 20, 40 or 60 grams/ton. The 60 gram/ton level exerted the most influence improving average daily gain and feed efficiency.

We claim:

1. A method of increasing growth and the utilization of feed in swine comprising orally administering to swine an effective amount of frenolicin B and the physiologically acceptable ester or salt thereof.

2. The method of claim 1, wherein the amount of frenolicin B is administered in the feed of said swine in an amount from about 20 grams/ton of feed to about 60 grams/ton of feed.

3. A swine feed which is useful for increasing growth, having dispersed therein, as an active ingredient, an effective amount of frenolicin B and the physiologically acceptable ester or salt thereof.

4. The swine feed of claim 3, wherein the amount of the active ingredient is in an amount from about 20 grams/ton of swine feed to about 60 grams/ton of swine feed.

5. A swine feed additive premix comprising swine feed and, as an active ingredient, an effective amount of frenolicin B and the physiologically acceptable ester or salt thereof.

6. The swine feed additive premix of claim 5, wherein the amount of the active ingredient is in an amount from about 20 grams/ton of swine feed composition to about 60 grams/ton of swine feed composition.

* * * * *